US009617907B2

United States Patent
Nam et al.

(10) Patent No.: US 9,617,907 B2
(45) Date of Patent: Apr. 11, 2017

(54) SYSTEM FOR CONTROLLING AIR FLOW INTO VEHICLE ENGINE COMPARTMENT

(71) Applicant: Hyundai Motor Company, Seoul (KR)

(72) Inventors: Jongwoo Nam, Seoul (KR); Hanshin Chung, Yongin-si (KR); Joonho Lee, Seoul (KR); Hyun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 190 days.

(21) Appl. No.: 14/551,029

(22) Filed: Nov. 23, 2014

(65) Prior Publication Data

US 2015/0345367 A1 Dec. 3, 2015

(30) Foreign Application Priority Data

May 27, 2014 (KR) .................. 10-2014-0063877

(51) Int. Cl.
| | |
|---|---|
| F01P 7/02 | (2006.01) |
| F01P 7/16 | (2006.01) |
| F01P 11/02 | (2006.01) |
| F01P 3/18 | (2006.01) |
| F01P 7/10 | (2006.01) |
| F28F 9/02 | (2006.01) |
| F28F 27/02 | (2006.01) |
| F28D 1/053 | (2006.01) |
| F28D 20/02 | (2006.01) |
| F01P 11/20 | (2006.01) |
| F28D 20/00 | (2006.01) |

(52) U.S. Cl.
CPC .... *F01P 7/16* (2013.01); *F01P 3/18* (2013.01); *F01P 7/10* (2013.01); *F01P 11/02* (2013.01); *F28D 1/05316* (2013.01); *F28D 20/02* (2013.01); *F28F 9/02* (2013.01); *F28F 27/02* (2013.01); *F01P 2011/205* (2013.01); *F28D 2020/0013* (2013.01)

(58) Field of Classification Search
CPC .. B60H 1/00271; B60K 11/04; B60K 11/085; F01P 7/06; F01P 11/02; F01P 7/16; F02B 29/0437; F28D 1/02; F28D 1/024
See application file for complete search history.

(56) References Cited

U.S. PATENT DOCUMENTS

| | | | | |
|---|---|---|---|---|
| 1,161,444 | A | * 11/1915 | Boughton | ................. E06B 9/40 160/121.1 |
| 1,170,730 | A | * 2/1916 | Benjamin et al. | ........ F01P 7/12 123/41.04 |

(Continued)

FOREIGN PATENT DOCUMENTS

| | | | |
|---|---|---|---|
| GB | 2143025 A | * 1/1985 | ............ F24D 11/002 |
| JP | 57212321 A | * 12/1982 | |

(Continued)

*Primary Examiner* — Marguerite McMahon
*Assistant Examiner* — Tea Holbrook
(74) *Attorney, Agent, or Firm* — Morgan, Lewis & Bockius LLP

(57) ABSTRACT

A system for controlling a flow rate of air into a vehicle engine compartment, may include a radiator cooling a coolant; a coolant inflow tank provided to one side of the radiator and temporarily storing the coolant that cools an engine; and a coolant exhaust tank provided to another side of the radiator and temporarily storing the coolant circulating past a cooling fin of the radiator from the coolant inflow tank.

14 Claims, 10 Drawing Sheets

(56) References Cited

U.S. PATENT DOCUMENTS

| | | | | |
|---|---|---|---|---|
| 1,771,714 | A * | 7/1930 | Lawrence | F01P 7/10 123/41.04 |
| 1,949,009 | A * | 2/1934 | Dintilhac | G05D 23/27537 123/41.04 |
| 2,034,587 | A * | 3/1936 | Maxwell | B60H 1/00464 165/98 |
| 2,246,823 | A * | 6/1941 | Vollberg | F01P 7/12 160/239 |
| 3,210,758 | A * | 10/1965 | Huston | G08B 5/24 340/815.65 |
| 3,854,459 | A * | 12/1974 | Stimeling | F01P 11/10 123/41.04 |
| D281,273 | S * | 11/1985 | Artwick | D23/390 |
| 4,590,889 | A * | 5/1986 | Hiereth | B60K 11/08 123/41.05 |
| 4,756,279 | A * | 7/1988 | Temmesfeld | F01P 11/10 123/198 E |
| 4,779,518 | A * | 10/1988 | Artwick | F24F 7/013 16/360 |
| 4,865,816 | A * | 9/1989 | Walz | A61L 9/122 239/60 |
| 5,060,901 | A * | 10/1991 | Lathrop | F04D 25/08 248/343 |
| 5,344,287 | A * | 9/1994 | Schaefer | F04D 29/601 415/213.1 |
| 5,758,716 | A * | 6/1998 | Shibata | F04D 19/002 123/41.49 |
| 6,024,536 | A * | 2/2000 | Tsubakida | B60H 1/00464 415/173.6 |
| 6,192,838 | B1 | 2/2001 | Matsuo et al. | |
| 6,309,178 | B1 * | 10/2001 | Kim | F01P 11/10 415/176 |
| 6,994,058 | B2 | 2/2006 | Iinuma et al. | |
| 7,025,086 | B2 * | 4/2006 | Maeda | F04D 25/14 137/512.1 |
| D524,435 | S * | 7/2006 | Linn | D23/390 |
| 7,882,888 | B1 | 2/2011 | Bugby | F28D 1/0477 165/10 |
| 8,197,204 | B2 * | 6/2012 | Aschermann | F04D 29/526 165/121 |
| 8,627,911 | B2 * | 1/2014 | Tregnago | B60K 11/085 180/68.1 |
| 8,922,033 | B2 * | 12/2014 | Vallinayagam | H02K 9/02 290/1 B |
| 8,936,121 | B2 * | 1/2015 | Vacca | B60K 11/04 165/44 |
| 2004/0216863 | A1 * | 11/2004 | Hu | F28D 1/0443 165/110 |
| 2004/0226764 | A1 * | 11/2004 | Iwasaki | F01P 3/20 180/68.1 |
| 2004/0261983 | A1 * | 12/2004 | Hu | F28D 1/0443 165/148 |
| 2005/0061487 | A1 * | 3/2005 | Kroliczek | F25B 23/006 165/139 |
| 2007/0119395 | A1 * | 5/2007 | Nagano | F01P 11/10 123/41.65 |
| 2007/0169725 | A1 * | 7/2007 | Harich | B60K 11/085 123/41.05 |
| 2010/0006043 | A1 | 1/2010 | Kardos | |
| 2010/0186934 | A1 * | 7/2010 | Bellenfant | F28D 1/0408 165/164 |
| 2011/0088671 | A1 | 4/2011 | Johnson | |
| 2011/0114286 | A1 * | 5/2011 | Komatsu | B60K 11/04 165/51 |
| 2011/0203861 | A1 * | 8/2011 | Charnesky | B60K 11/085 180/68.1 |
| 2011/0219762 | A1 | 9/2011 | Kobayashi | |
| 2011/0232865 | A1 * | 9/2011 | Mildner | B60K 11/085 165/98 |
| 2012/0055153 | A1 | 3/2012 | Murata et al. | |
| 2012/0090823 | A1 * | 4/2012 | Labaste Mauhe | B60H 1/00328 165/173 |
| 2012/0227926 | A1 * | 9/2012 | Field | F24D 11/003 165/10 |
| 2012/0263980 | A1 * | 10/2012 | Soukhojak | C09K 5/04 429/50 |
| 2012/0291991 | A1 * | 11/2012 | Denkenberger | B21D 53/045 165/81 |
| 2012/0318473 | A1 * | 12/2012 | Nishikawa | B60H 1/00328 165/41 |
| 2013/0284415 | A1 * | 10/2013 | Katoh | F25B 39/04 165/175 |
| 2013/0316634 | A1 | 11/2013 | Ajisaka | |
| 2014/0090808 | A1 * | 4/2014 | Bessho | C09K 5/063 165/104.17 |
| 2014/0366816 | A1 * | 12/2014 | Platt | F01P 3/20 123/41.3 |
| 2015/0101789 | A1 | 4/2015 | Enomoto et al. | |
| 2015/0315955 | A1 * | 11/2015 | Nam | F01P 5/02 123/41.04 |
| 2015/0330288 | A1 * | 11/2015 | Nam | B60K 11/085 165/96 |

FOREIGN PATENT DOCUMENTS

| | | |
|---|---|---|
| JP | 2004-284514 A | 10/2004 |
| JP | 2005-170375 A | 6/2005 |
| JP | 2010-001767 A | 1/2010 |
| JP | 4450066 B2 | 2/2010 |
| JP | 2010025009 A * | 2/2010 |
| JP | 2011-126434 A | 6/2011 |
| JP | 2012-240478 A | 12/2012 |
| JP | 2012246790 A * | 12/2012 |
| KR | 20-1998-033347 U | 9/1998 |
| KR | 10-2002-0092050 A | 12/2002 |
| KR | 10-2011-0080037 A | 7/2011 |
| KR | 10-2011-0096760 A | 8/2011 |
| KR | 10-2011-0109034 A | 10/2011 |
| KR | 10-2012-0050871 A | 5/2012 |
| KR | 10-2012-0058952 A | 6/2012 |
| KR | 10-2013-0063663 A | 6/2013 |
| KR | 10-2013-0143704 A | 12/2013 |

* cited by examiner

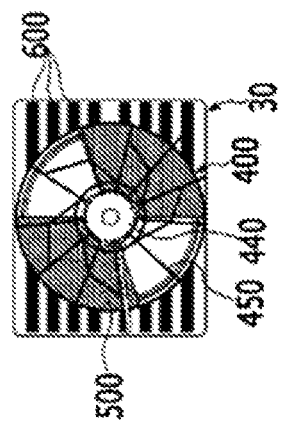
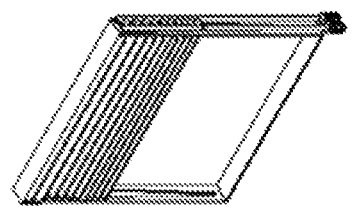
FIG. 10A  FIG. 10B  FIG. 10C  FIG. 10D

SYSTEM FOR CONTROLLING AIR FLOW INTO VEHICLE ENGINE COMPARTMENT

CROSS-REFERENCE TO RELATED APPLICATION

The present application claims priority to and the benefit of Korean Patent Application No. 10-2014-0063877 filed on May 27, 2014, the entire contents of which is incorporated herein for all purposes by this reference.

BACKGROUND OF THE INVENTION

Field of the Invention

The present invention relates to a system for controlling a rate of air flow into a vehicle engine compartment. More particularly, the present invention relates to a system for controlling a rate of air flow into a vehicle engine compartment which may improve cooling performance and aerodynamic performance of a vehicle.

Description of Related Art

In general, a radiator for cooling an engine and a condenser for condensing a refrigerant in an air conditioner are mounted in a vehicle, and temperatures of the radiator and the condenser are lowered by operating a cooling fan. It is advantageous to quickly raise the temperature of the engine to an appropriate level when the vehicle is initially started to improve fuel efficiency, and the temperature of the engine needs to be maintained at an appropriate temperature after initial start.

The cooling fan is traditionally operated by operation of the engine, but this mechanical method has a drawback in that fuel efficiency of the vehicle deteriorates because the cooling fan is always operated whenever the engine is operated.

Recently, a method of operating an electric motor has been used, and with respect to the above method, the cooling fan is operated only out of necessity in response to a driving state of the vehicle, such that there is an effect of improving fuel efficiency, and as a result, the use of this manner is increased.

Meanwhile, aerodynamic characteristics greatly affect fuel efficiency and speed of the vehicle when a traveling speed of the vehicle is increased, and when air flowing into an engine compartment of the vehicle is shut off when the vehicle travels at a high speed, drag, which is generated when air passes through the engine compartment, is reduced so that fuel efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for controlling a flow rate of air into a vehicle engine compartment and a control method thereof, which may improve cooling performance and aerodynamic performance of a vehicle.

In addition, various aspects of the present invention are directed to providing a system for controlling a flow rate of air into a vehicle engine compartment and a control method thereof, which may reduce drag by minimizing an operation of a cooling fan, and shutting off air flowing into an engine compartment out of necessity.

A system for controlling a flow rate of air into a vehicle engine compartment, may include a radiator cooling a coolant, a coolant inflow tank provided to one side of the radiator and temporarily storing the coolant that cools an engine, and a coolant exhaust tank provided to another side of the radiator and temporarily storing the coolant circulating past a cooling fin of the radiator from the coolant inflow tank.

The system may further include phase change material (PCM) tanks provided to an exterior side of the coolant inflow tank and the coolant exhaust tank and storing a phase change material, wherein the phase change material heat-exchanges with the coolant stored in the coolant inflow tank and the coolant exhaust tank.

The system may further include a fan shroud in which a cooling fan including a fan motor and a fan blade is mounted, the fan shroud disposed between the radiator and the engine, a rotary shutter which is provided in the fan shroud while corresponding to an operation area of the fan blade, and in which an area through which air passes is varied in a circumferential direction, and a plurality of flaps which are provided in the fan shroud, and that open and close a part of a portion where the rotary shutter is not mounted.

The rotary shutter may include a plurality of shutter blades which are provided to be rotatable about a rotation shaft, and a shutter actuator which rotates the plurality of shutter blades, and changes the area through which air passes.

The shutter blades may include an operation blade which is rotated about the rotation shaft by an operation of the shutter actuator, and a plurality of sub-blades which are provided to be superimposed on the basis of the rotation shaft to be spread or folded fanwise in accordance with rotation of the operation blade.

Operation protrusions are provided to the shutter blades, respectively, when the operation blade is spread or folded, any one of the plurality of sub-blades is spread or folded, and remaining sub-blades are sequentially spread or folded.

Electromagnets are provided on the plurality of flaps so that the plurality of flaps are opened and closed in accordance with an electric current supplied to the electromagnets.

The system may further include an air flow rate control shutter apparatus disposed between the radiator and a condenser disposed at a front of the radiator, wherein the air flow rate control shutter apparatus may include vertical supporting portions provided as a pair, a plurality of air flaps provided to the vertical supporting portion to be spread or folded, a delivery unit selectively spreading the air flaps, a rotation unit selectively rotating the air flaps, and a controller controlling the delivery unit and the rotation unit according to an operation status of a vehicle.

The vertical supporting portion may include a guide rail having a width which becomes smaller along a lower direction, wherein stoppers are provided in the plurality of air flaps, the stoppers having a size corresponding to the width of the guide rail so that the plurality of air flaps are positioned at predetermined positions.

The delivery unit may include a delivery screw provided to any one of the guide rails, a delivery plate supporting a lowest air flap of the plurality of air flaps, engaged with the delivery screw, and adjusting a position of the lowest air flap when the delivery screw is rotated, and a delivery motor selectively rotating the delivery screw.

The rotation unit may include rotation gears respectively engaged to the plurality of air flaps, a rotation screw provided to another guide rail and selectively engaged with the rotation gears, and a rotation motor selectively rotating the rotation screw.

The delivery unit may include a delivery screw provided to any one of the guide rails, and a delivery plate supporting a lowest air flap of the plurality of air flaps, engaged with the delivery screw, and adjusting a position of the lowest air flap when the delivery screw is rotated, wherein the rotation unit may include rotation gears respectively engaged to the plurality of air flaps, and a rotation screw provided to another guide rail and selectively engaged with the rotation gears, wherein the air flow rate control shutter apparatus may further include a driving motor selectively rotating the delivery screw or the rotation screw.

The system may further include an encapsulator which surrounds the engine compartment.

The system may further include a controller controlling an open area of the rotary shutter, operations of opening and closing the plurality of fan flaps, the cooling fan, the delivery unit, and the rotation unit according to an operation status of the vehicle, wherein the operation modes of the system may include a first mode in which the plurality of flaps are closed, the rotary shutter is completely closed, the plurality of air flaps are completely closed, and the operation of the cooling fan is turned off, a second mode in which the plurality of fan flaps are closed, the rotary shutter is completely opened, a rotation angle of the air flaps is controlled in a state that the plurality of air flaps are expanded, and the operation of the cooling fan is turned off, a third mode in which the plurality of fan flaps are opened, the rotary shutter is completely opened, the air flaps are completely opened in a state that the plurality of air flaps are expanded, and the operation of the cooling fan is turned off, and a fourth mode in which the plurality of fan flaps are closed, the open area of the rotary shutter is controlled, the plurality of air flaps are folded, and the operation of the cooling fan is controlled.

The system may include an atmospheric temperature sensor which measures an atmospheric temperature, and outputs a corresponding signal, a speed sensor which measures a vehicle speed, and outputs a corresponding signal, an air conditioning pressure sensor which measures air conditioning internal pressure, and outputs a corresponding signal, an air conditioning switch sensor which measures an operational signal of an air conditioning switch, and outputs a corresponding signal, a refrigerant temperature sensor which measures a refrigerant temperature, and outputs a corresponding signal, and a position sensor which measures the open area of the rotary shutter, and outputs a corresponding signal, wherein the control unit determines the operating state of the vehicle based on the corresponding signals from the respective sensors, and controls operations of the rotary shutter, the plurality of flaps, and the cooling fan in accordance with the operating state of the vehicle in any one mode of the first to fourth modes.

According to an aspect of the present invention, since the coolant inflow tank and the coolant exhaust tank are provided to respective sides of the radiator, an additional refrigerant storing tank does not need to be provided. Therefore, a degree of freedom for designing the vehicle engine compartment is increased.

Further, since the PCM tank is provided to the exterior of the coolant inflow tank and the coolant exhaust tank, cooling efficiency of the radiator is improved through heat-exchange between the coolant and the PCM.

Further, cooling performance can be improved by controlling the cooling fan based on the driving state of the vehicle, and aerodynamic performance may be improved by adjusting an amount of air flowing into the vehicle engine compartment.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10A, FIG. 10B, FIG. 10C and FIG. 10D are views illustrating operation modes of the fan shroud and the air flow rate control shutter apparatus according to an exemplary embodiment of the present invention.

Figure 1:
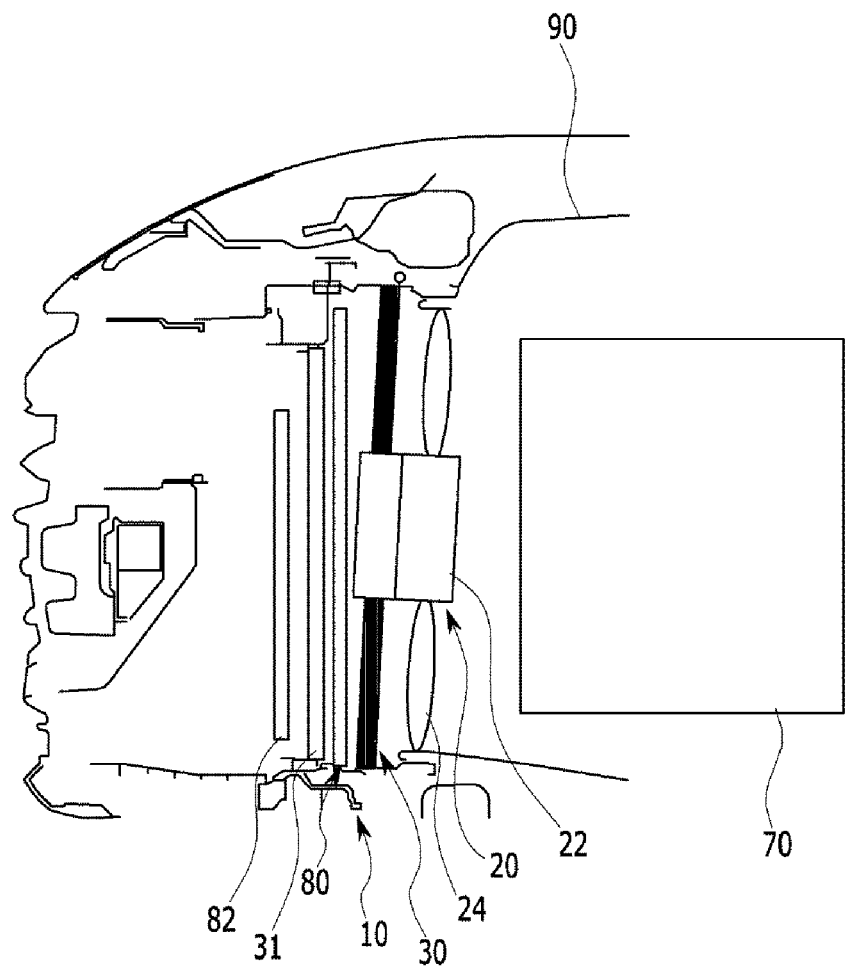
FIG. 1 is a cross-sectional view illustrating a system for controlling a rate of air flow into a vehicle engine compartment according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Like reference numerals designate like elements throughout the specification.

In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

Throughout the specification and the claims, unless explicitly described to the contrary, the word "comprise" and variations such as "comprises" or "comprising" will be understood to imply the inclusion of stated elements but not the exclusion of any other elements.

An exemplary embodiment of the present invention will hereinafter be described in detail with reference to the accompanying drawings.

Figure 2:
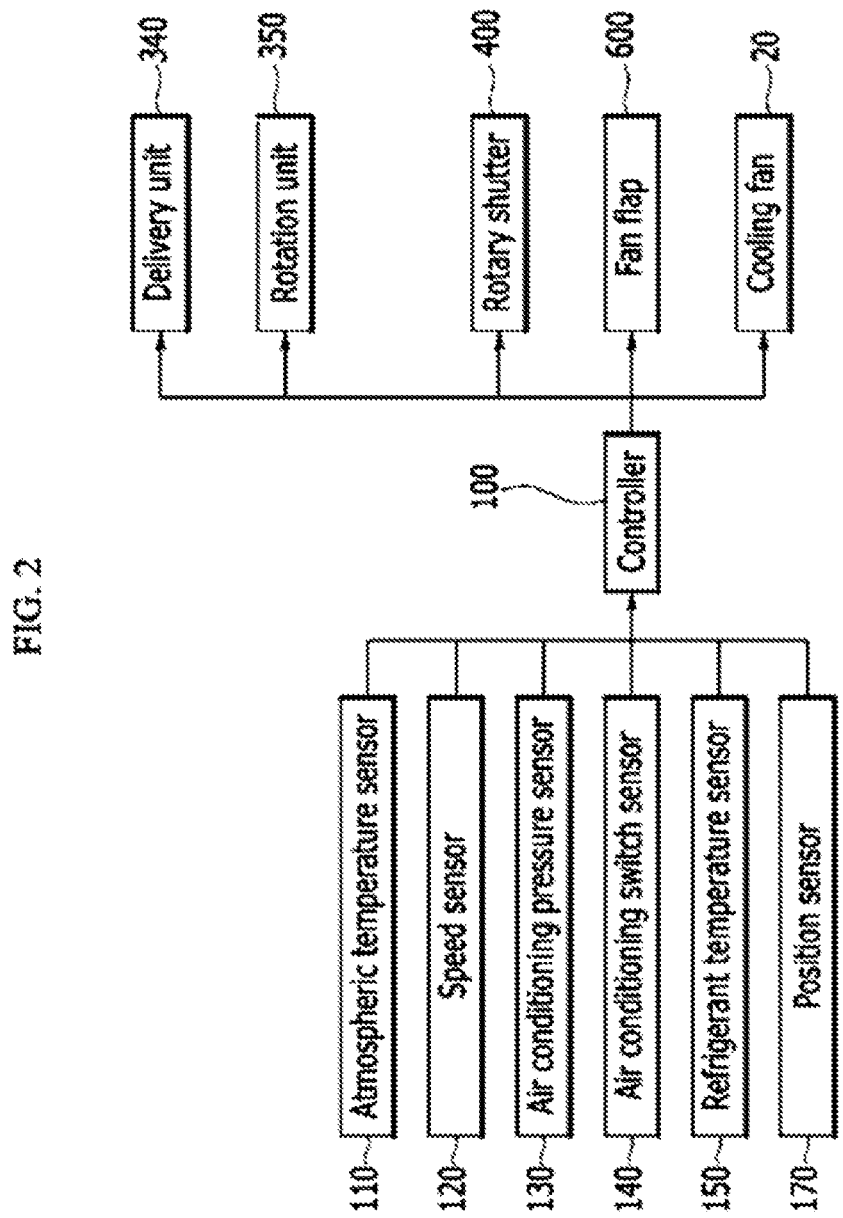
FIG. 2 is a block diagram illustrating the system for controlling a rate of air flow into a vehicle engine compartment according to the exemplary embodiment of the present invention.
Figure 3:
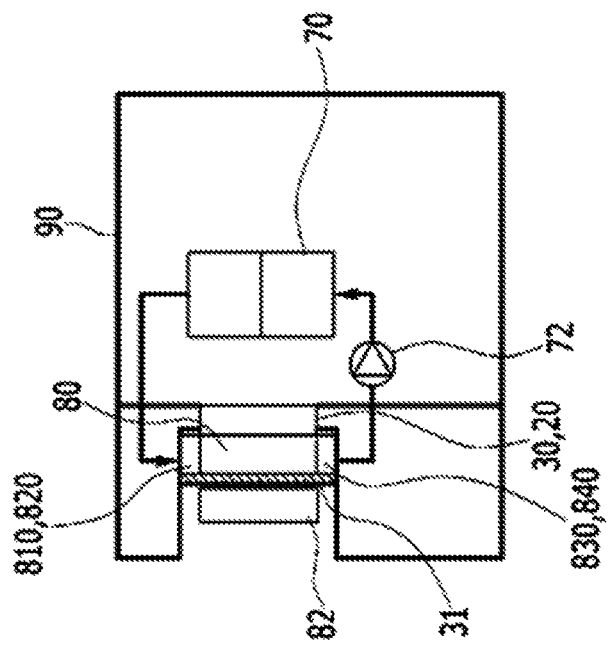
FIG. 3A and FIG. 3B are schematic diagrams illustrating the system for controlling a rate of air flow into a vehicle engine compartment according to the exemplary embodiment of the present invention.
Figure 3:
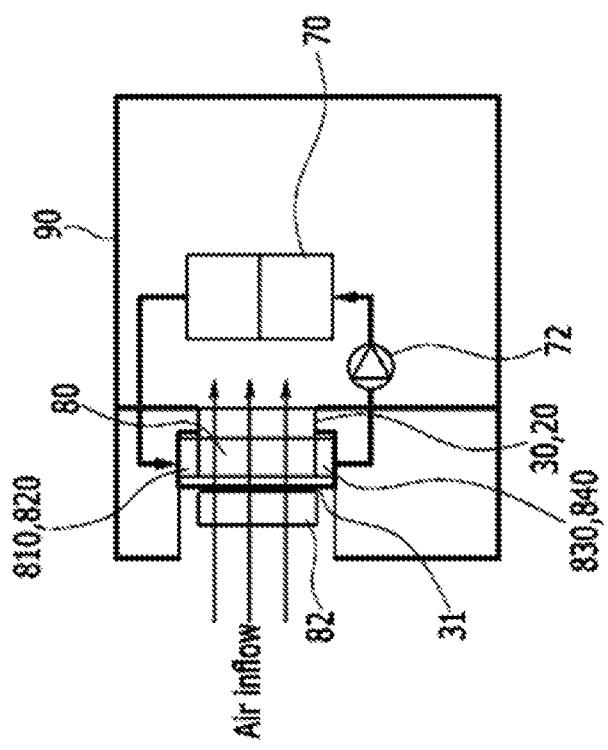

FIG. 1 is a cross-sectional view illustrating a system for controlling a flow rate of air into a vehicle engine compartment according to an exemplary embodiment of the present invention. And FIG. 2 is a block diagram illustrating the system for controlling a flow rate of air into a vehicle engine compartment according to the exemplary embodiment of the present invention. And FIG. 3A and FIG. 3B are schematic diagrams illustrating the system for controlling a flow rate of air into a vehicle engine compartment according to the exemplary embodiment of the present invention. FIG. 3A illustrates a state in which air flows into an engine compartment, and FIG. 3B illustrates a state in which air is blocked into the engine compartment.

As shown in FIG. 1 to FIG. 3B, a system for controlling a rate of air flow into a vehicle engine compartment includes a radiator 80 cooling a coolant, a coolant inflow tank 810 and a coolant exhaust tank 830 provided at respective sides of the radiator 80, an air flow rate control shutter apparatus provided at front of the radiator 80 and controlling an amount of air flowing into an engine 70, a fan shroud 30, a cooling fan 20 provided at the rear of the fan shroud 30, and a controller 100 controlling the fan shroud 30, the cooling fan 20, and the air flow rate control shutter apparatus.

A condenser 82 may be provided at the front of the radiator 80.

The system for controlling the rate of air flow into the vehicle engine compartment according to an exemplary embodiment of the present invention may further include an encapsulator 90 that surrounds the engine compartment, and the encapsulator 90 serves to prevent noise and vibration generated by the engine 70 from being transmitted to the outside of the vehicle body 10, and reduces drag by guiding wind which is generated when the vehicle travels when the wind flows into the engine compartment.

In addition, the encapsulator 90 preserves heat generated in the engine 70, and may enable the engine 70 to be operated at an optimum operation temperature when the vehicle travels again in a predetermined time after the vehicle stops.

Referring to FIG. 2, the system for controlling a flow rate of air into a vehicle engine compartment may include an atmospheric temperature sensor 110 which measures an atmospheric temperature, and outputs a corresponding signal, a speed sensor 120 which measures a vehicle speed and outputs a corresponding signal, an air conditioning pressure sensor 130 which measures air conditioning internal pressure and outputs a corresponding signal, an air conditioning switch sensor 140 which measures an operational signal of an air conditioning switch and outputs a corresponding signal, a refrigerant temperature sensor 150 which measures a refrigerant temperature and outputs a corresponding signal, and a position sensor 170 which measures an open area of the rotary shutter 400, and outputs a corresponding signal. The controller 100 receives output signals of respective sensors, determines the operating state of the vehicle based on the corresponding signals from the respective sensors, and controls the cooling fan 20, the fan shroud 30, and an air flow rate control shutter apparatus 31.

Figure 4B:
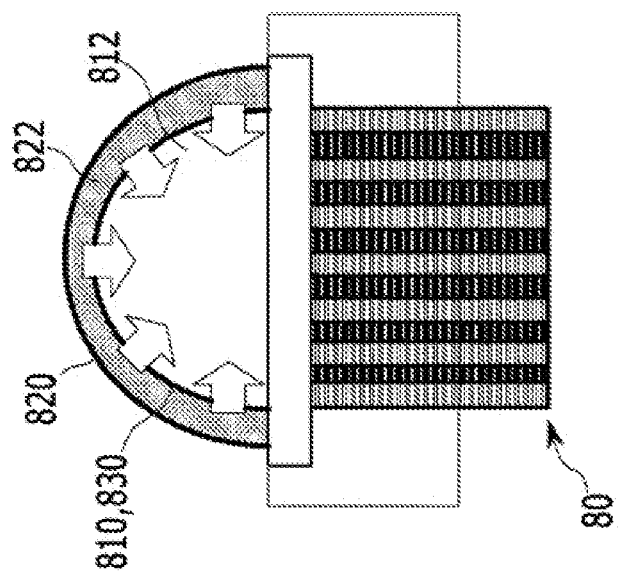
FIG. 4A and FIG. 4B are cross-sectional views illustrating a radiator, a refrigerant storing tank, and a PCM tank according to an exemplary embodiment of the present invention.
Figure 4A:
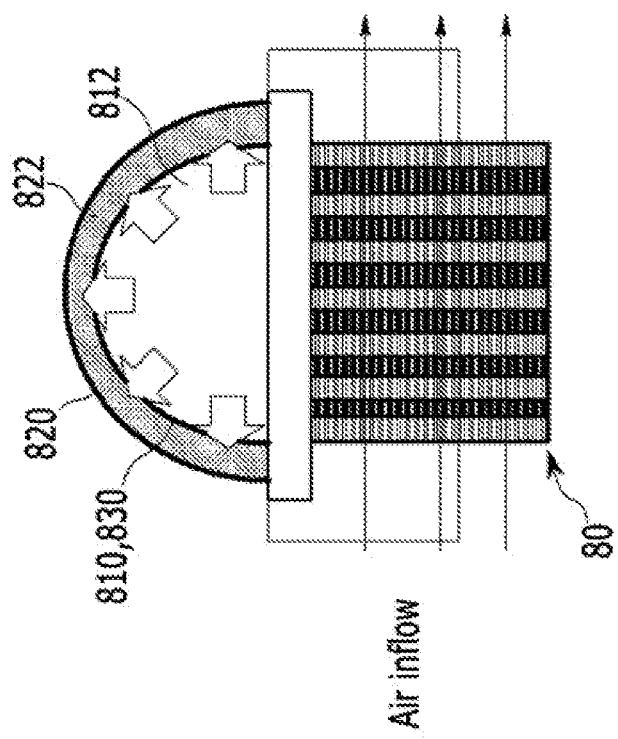

FIG. 4A and FIG. 4B are cross-sectional views illustrating a radiator, a refrigerant storing tank, and a phase change material (PCM) tank 820 according to an exemplary embodiment of the present invention.

As shown in FIG. 4A and FIG. 4B, the radiator 80 includes cooling fins, a coolant inflow tank 810, and a coolant exhaust tank 830. The radiator 80 cools coolant that cools the engine 70 with air, and thereby has a high temperature. The coolant inflow tank 810 is provided to one side of the radiator 80, and temporarily stores coolant that cools the engine 70. The coolant exhaust tank 830 is provided to the other side of the radiator 80, and temporarily stores coolant that circulates past the cooling fins from the coolant inflow tank 810.

The PCM tank 820 may be provided to exterior side of the coolant inflow tank 810 and the coolant exhaust tank 830, and stores a phase change material. The phase change material (PCM) stored in the PCM tank 820 heat-exchanges with the coolant temporarily stored in the coolant inflow tank 810 and the coolant exhaust tank 830.

When the engine 70 needs to be cooled, a temperature in the coolant inflow tank 810 and the coolant exhaust tank 830 is higher than a temperature of the phase change material in the PCM tank 820. In this case, heat of the coolant is transferred to the phase change material (refer to FIG. 4A). Therefore, it is possible to increase cooling efficiency of the coolant.

On the contrary, when the engine 70 does not need to be cooled, heat of the phase change material is transferred to the coolant (refer to FIG. 4B). Therefore, the temperature of the coolant can be maintained over a predetermined temperature. Here, a status when the engine 70 does not need to be cooled may be a status of warm-up of the engine 70 for a predetermined time after the engine 70 starts, a state that the temperature of the engine 70 does not need to be maintained while the engine 70 is turned off, or the vehicle travels at a high speed with a low load.

Since refrigerant storing tanks (the coolant inflow tank and the coolant exhaust tank) are provided at respective sides of the radiator 80, an additional refrigerant storing tank does not need to be provided in a coolant line. Therefore, a degree of freedom for designing the vehicle engine compartment is increased.

A circulating process of the coolant will now be briefly described. The coolant having a high temperature by circulating in the engine 70 is temporarily stored in the coolant inflow tank 810. The coolant stored in the coolant inflow tank 810 is heat-exchanged with the phase change material stored in the PCM tank 820. The coolant temporarily stored in the coolant inflow tank 810 is circulated through the radiator 80 and cooled by heat-exchange with air flowing from the outside. The coolant circulating through the radiator 80 is temporarily stored in the coolant exhaust tank 830. The coolant temporarily stored in the coolant exhaust tank 830 is heat-exchanged with the phase change material stored in the PCM tank 820. The coolant stored in the coolant exhaust tank 830 flows again into the engine 70. The circulation of the coolant is performed by a water pump 72.

Figure 5:
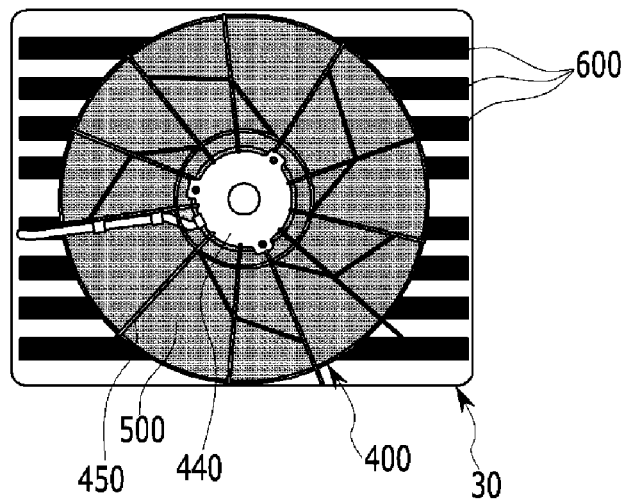
FIG. 5 is a top plan view illustrating a fan shroud according to an exemplary embodiment of the present invention.
Figure 6A:
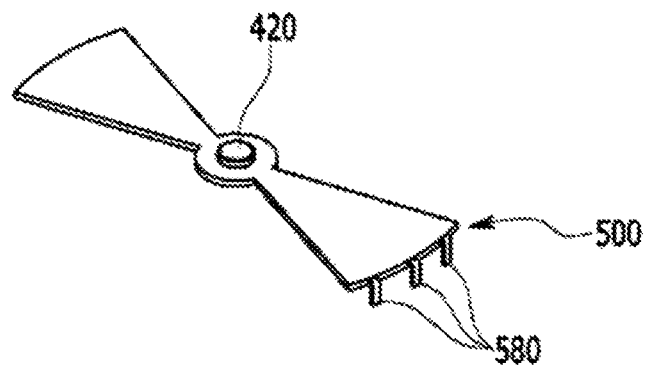
FIG. 6A and FIG. 6B are views illustrating a fan flap of the fan shroud according to an exemplary embodiment of the present invention.
Figure 6B:
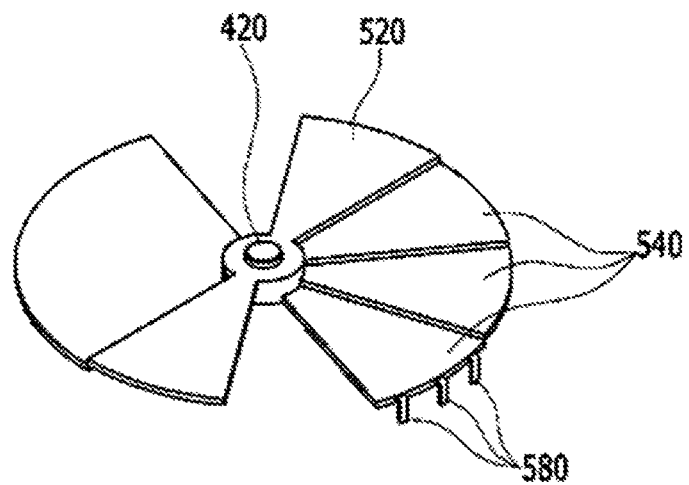

Hereinafter, the fan shroud 30 and the cooling fan 20 will be described in detail. FIG. 5 is a top plan view illustrating a fan shroud according to an exemplary embodiment of the present invention. FIG. 6A and FIG. 6B are views illustrating a fan flap of the fan shroud according to an exemplary embodiment of the present invention.

Referring to FIG. 5, the fan shroud 30 includes a cooling fan 20 including a fan motor 22 and a fan blade 24. A rotary shutter 400 is provided in the fan shroud 30 while corresponding to an operation area of the fan blade 24, and in which an area through which air passes is varied in a circumferential direction. A plurality of fan flaps 600 are provided in the fan shroud 30, and open and close a part of a portion where the rotary shutter 400 is not mounted. A controller 100 is provided in the fan shroud 30, controls an open area of the rotary shutter 400, operations of opening and closing the plurality of fan flaps 600, and the cooling fan 20 according to an operation status of the vehicle.

The rotary shutter 400 includes a plurality of shutter blades 500 which are provided to be rotatable about a rotation shaft 420, and a shutter actuator 440 which rotates the plurality of shutter blades 500 and changes an area through which air passes.

The shutter actuator 440 may be a servo motor capable of being rotated in forward and reverse directions, and may be mounted in the fan shroud 30 by mounting supporters 450.

The shutter blades 500 include an operation blade 520 which is rotated about the rotation shaft 420 by an operation of the shutter actuator 440, and a plurality of sub-blades 540 which are provided to be superimposed on the basis of the rotation shaft 420 to be spread fanwise or folded in accordance with the rotation of the operation blade 520.

When the operation blade 520 is spread or folded, any one of the plurality of sub-blades 540 may be spread or folded, and then the remaining sub-blades 540 may be sequentially spread or folded.

The operation blade 520 and the sub-blades 540 are superimposed on the basis of the rotation shaft 420, and when the operation blade 520 is rotated about the rotation shaft 420 at a predetermined angle by an operation of the shutter actuator 440, the sub-blade 540 which is closest to the operation blade 520 is rotated while a protrusion formed at the sub-blade 540 is caught by the protrusion of the operation blade 520.

In this manner, the respective sub-blades 540 illustrated in the drawings are sequentially spread fanwise.

On the contrary, when the shutter actuator 440 rotates the operation blade 520 in the reverse direction, the sub-blade 540 which is closest to the operation blade 520 is rotated in the reverse direction while the protrusion of the sub-blade 540 is pushed by the opposite protrusion of the operation blade 520.

In this manner, the respective sub-blades 540 illustrated in the drawings are sequentially folded.

Mounting protrusions 580 may be formed on the sub-blade 540 that is positioned at the very end among the sub-blades 540 so that the sub-blade 540 may be fixed to the fan shroud 30.

Electromagnets are provided on the plurality of flaps 600, such that the plurality of flaps 600 may be opened and closed in accordance with an electric current supplied to the electromagnets, and flap rotation shafts are provided on the flaps 600, respectively, so that the flaps 600 may be rotated about the rotation shafts, respectively.

The flap rotation shaft may be a torsion spring, and the flap 600 may be maintained in an opened state when the electric current is not supplied to the electromagnet. In the case of failure of an electric current supply device, the flap 600 is maintained in the opened state to prevent the engine 70 from being overheated.

Figure 7:
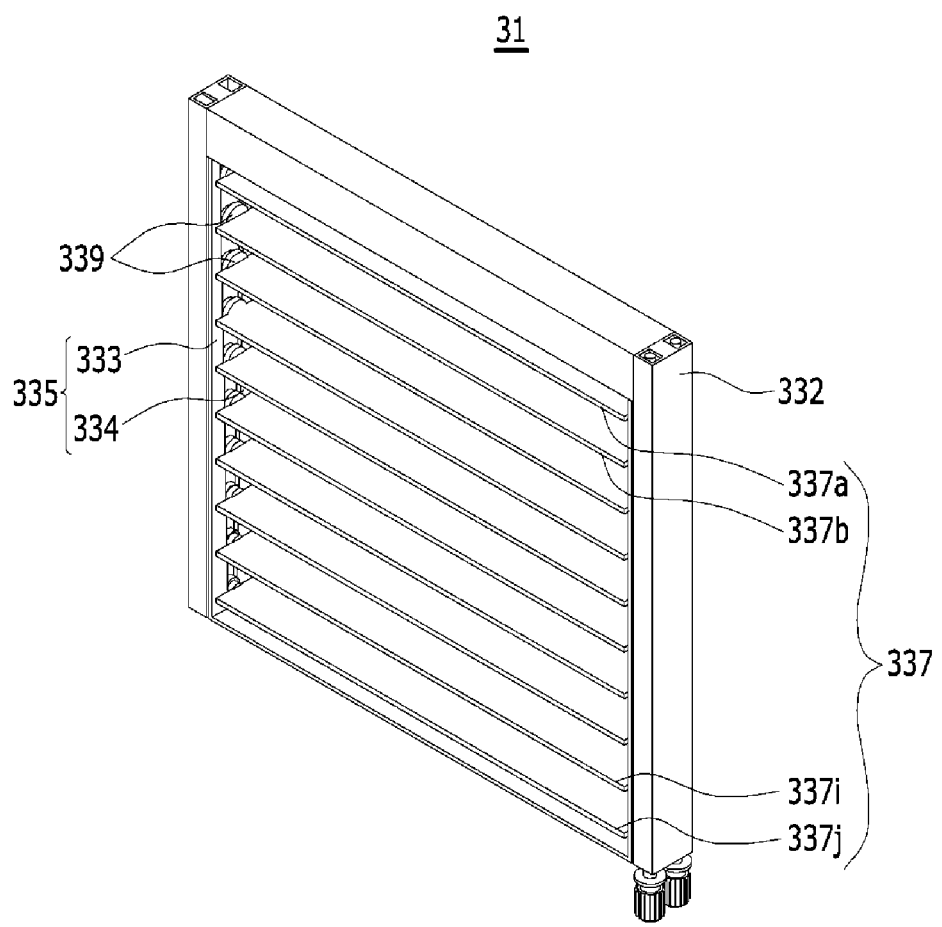
FIG. 7 is a perspective view illustrating an air flow rate control shutter apparatus according to an exemplary embodiment of the present invention.
Figure 8:
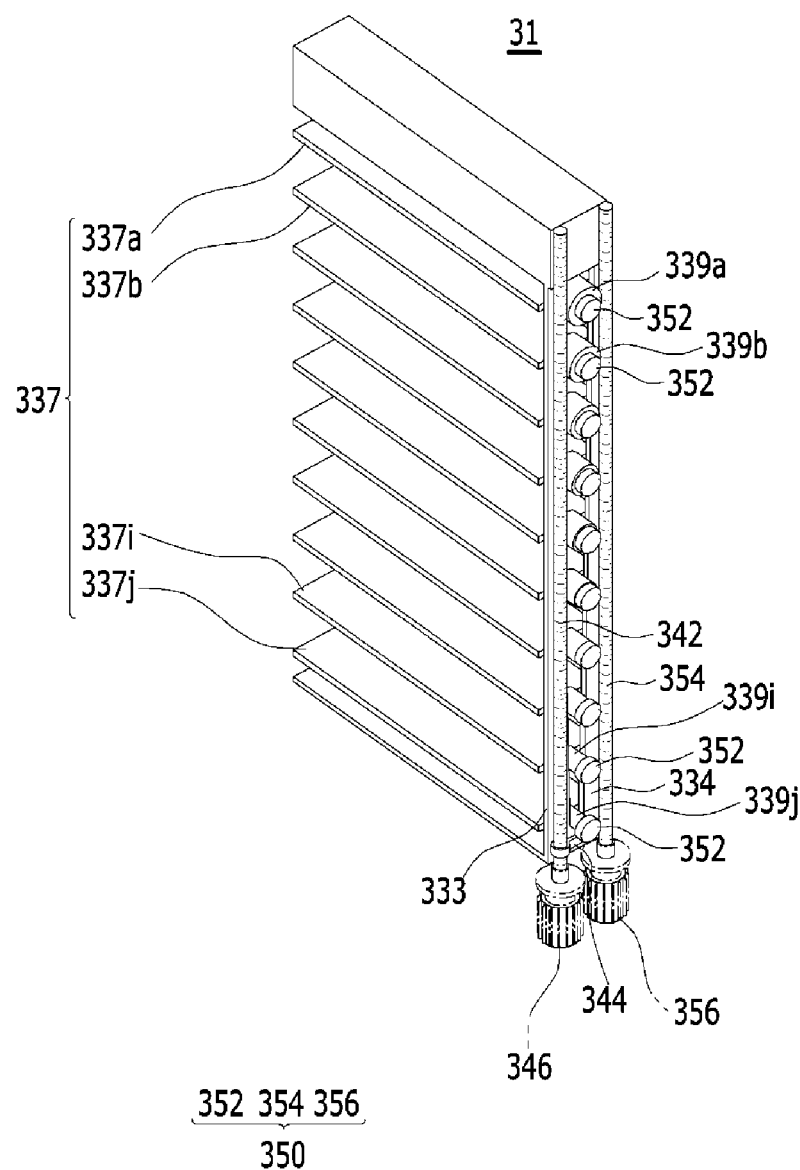
FIG. 8 is a partial perspective view illustrating the air flow rate control shutter apparatus according to an exemplary embodiment of the present invention.
Figure 9:
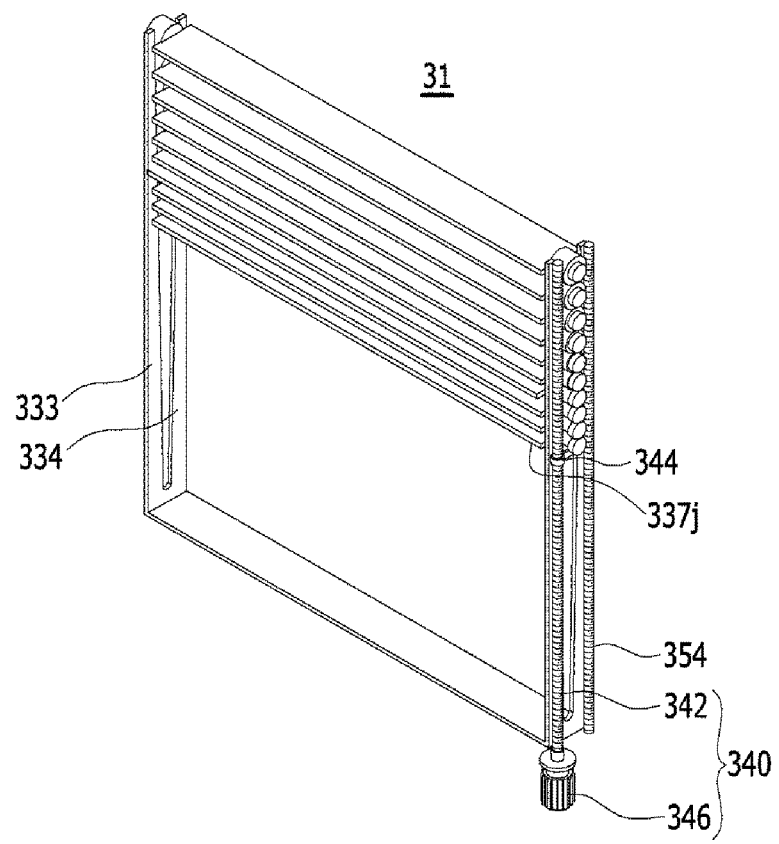
FIG. 9 is a perspective view illustrating the air flow rate control shutter apparatus in which the air flap is folded according to an exemplary embodiment of the present invention.

Hereinafter, the air flow rate control apparatus will be described in detail. FIG. 7 is a perspective view illustrating an air flow rate control shutter apparatus according to an exemplary embodiment of the present invention. FIG. 8 is a partial perspective view illustrating the air flow rate control shutter apparatus according to an exemplary embodiment of the present invention. FIG. 9 is a perspective view illustrating the air flow rate control shutter apparatus in which the air flap is folded according to an exemplary embodiment of the present invention.

Referring to FIG. 7 to FIG. 9, the air flow rate control shutter apparatus 31 includes vertical supporting portions provided as pairs, a plurality of air flaps 337 provided to the vertical supporting portion to be spread or folded, a delivery unit 340 selectively spreading the air flaps 337, and a rotation unit 350 selectively rotating the air flaps 337.

The vertical supporting portion includes a vertical supporting cover 332, a guide rail 335 provided in the vertical supporting cover 332 and having a width which becomes smaller along a lower direction, and stoppers 339*a* to 339*j* provided in the a plurality air flaps 337*a* to 337*j*, wherein the stoppers have a size corresponding to the width of the guide rail 335 so that the plurality of air flaps are positioned at a predetermined position.

The guide rail 335 includes a front guide rail 333 and a rear guide rail 334, and a distance between the front guide rail 333 and the rear guide rail 334 becomes smaller along a lower direction. A size of the stoppers 339*a* to 339*j* provided to the plurality of air flaps 337 is decreased in proportion to the distance between the front guide rail 333 and the rear guide rail 334.

The delivery unit 340 includes a delivery screw 342 provided to any one of the guide rails 335 (for example, the front guide rail 333), a delivery plate 344 supporting the lowest air flap of the plurality of air flaps 337*a* to 337*j*, engaged with the delivery screw 342, and adjusting a position of the lowest air flap when the delivery screw 342 is rotated, and a delivery motor 346 selectively rotating the delivery screw 342.

The rotation unit 350 includes a rotation gear 352 respectively engaged to the plurality of air flaps, a rotation screw 354 provided to the other guide rail (for example, the rear guide rail 334) and selectively engaged with the rotation gears 352, and a rotation motor 356 selectively rotating the rotation screw 354.

Hereinafter, operation of the air flow rate control shutter apparatus 31 will be described in detail.

When the controller 100 operates the delivery motor 346 in state that the plurality of air flaps 337a to 337j are folded according to an operation status of the vehicle, the delivery screw 342 is rotated, and the delivery plate 344 engaged with the delivery screw 342 is moved down.

Then, the stoppers 339a to 339j respectively engaged with the plurality of air flaps 337a to 337j are positioned to a predetermined position such that the size of the stopper 339a to 339j corresponds to the distance between the front guide rail 333 and the rear guide rail 334.

When the controller 100 operates the rotation motor 356 according to the operation status of the vehicle, the rotation screw 354 is rotated, the plurality of air flaps 337a to 337j are rotated by the rotation gear 352, and air flowing through the plurality of air flaps 337a to 337j is controlled.

When the controller 100 folds the plurality of air flaps 337a to 337j according to the operation status of the vehicle, the controller 100 controls operations of the rotation motor 356 and the delivery motor 346 in reverse order.

Hereinafter, operation of the system for controlling the air flow rate control apparatus for the vehicle according to an exemplary embodiment of the present invention will be described in detail with reference to FIGS. 10A-10D.

As shown in FIGS. 10A-10D, operation modes of the system according to an exemplary embodiment of the present invention may be divided into the following four modes.

A first mode is one in which the plurality of fan flaps 600 are closed, the rotary shutter 400 is completely closed, the plurality of air flaps 337 are completely closed, and the operation of the cooling fan 20 is turned off.

A second mode is one in which the plurality of fan flaps 600 are closed, the rotary shutter 400 is completely opened, a rotation angle of the air flap 337a to 337j is controlled in state that the plurality of air flaps 337 are expanded, and the operation of the cooling fan 20 is turned off.

A third mode is one in which the plurality of fan flaps 600 are opened, the rotary shutter 400 is completely opened, the air flaps 337a to 337j are completely opened in a state that the plurality of air flaps 337a to 337j are expanded, and the operation of the cooling fan 20 is turned off.

A fourth mode is one in which the plurality of fan flaps 600 are closed, the open area of the rotary shutter 400 is controlled, the plurality of air flaps 337a to 337j are folded, and the operation of the cooling fan 20 is controlled.

The first mode is a state in which aerodynamic performance required for cooling of the engine is not required, for example, may be a state in which it is necessary to warm up the engine 70 for a predetermined time after the engine of the vehicle starts, or a state in which it is necessary to maintain a temperature of the engine 70 when turning off the engine, or a state in which the vehicle travels in a high-speed and low-load condition. The corresponding condition may be stored in a predetermined map in advance, and the control unit 100 may compare the map with the operating state of the vehicle to determine the first mode.

The second mode is a state in which aerodynamic performance and cooling of the engine can be simultaneously optimized, the open area of the air flap 337 is controlled without operation of the cooling fan 20, and the engine speed is low. The corresponding condition may be stored in a predetermined map in advance, and the control unit 100 may compare the map with the operating state of the vehicle to determine the second mode.

The third mode may be a state which corresponds to a high-speed and high-load condition, and the engine 70 can be cooled without operation of the cooling fan 20 at a high speed. The corresponding condition may be stored in a predetermined map in advance, and the control unit 100 may compare the map with the operating state of the vehicle to determine the third mode.

The fourth mode may be a state in which cooling performance is maintained at a low-speed and high-load condition, and operation of the cooling fan 20 can be determined by a coolant temperature, a vehicle speed, etc. The corresponding condition may be stored in a predetermined map in advance, and the control unit 100 may compare the map with the operating state of the vehicle to determine the fourth mode.

The low-speed or the high-speed condition, for example, may be that of a vehicle speed of about 30-40 kph or about 90-110 kph, but is not limited thereto. The high-load condition, for example, may be that of the engine RPM of about 2000-4000, but is not limited thereto.

As described above, according to the system for controlling a flow rate of air into a vehicle engine compartment according to the exemplary embodiment of the present invention, cooling performance may be improved by controlling use of the cooling fan 20, the fan shroud 30, and the air flow rate control shutter apparatus 31 based on the driving state of the vehicle, and aerodynamic performance may be improved by adjusting an amount of air flowing into the vehicle engine compartment.

Further, the coolant having a relatively high temperature temporally stored in the coolant inflow tank 810 and the coolant exhaust tank is heat-exchanged with the phase change material having a relatively low temperature stored in PCM tank 820 during circulation of the coolant cooling the engine. Therefore, cooling performance of the engine 70 is improved.

Further, when cooling of the engine is not required, the phase change material having a relatively high temperature stored in the PCM tank 820 is heat-exchanged with the coolant having a relatively low temperature stored in the coolant inflow tank 810 and the coolant exhaust tank 830. Therefore, when a temperature of the engine compartment needs to be maintained at a predetermined temperature, it becomes easy to maintain the temperature of the engine compartment.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling a flow rate of air into a vehicle engine compartment, comprising:
   a radiator cooling a coolant;
   a coolant inflow tank provided to one side of the radiator and temporarily storing the coolant that cools an engine;

a coolant exhaust tank provided to another side of the radiator and temporarily storing the coolant circulating past a cooling fin of the radiator from the coolant inflow tank; and an air flow rate control shutter apparatus disposed between the radiator and a condenser disposed at a front of the radiator, wherein the air flow rate control shutter apparatus includes:
vertical supporting portions provided as a pair;
a plurality of air flaps provided to the vertical supporting portion to be spread or folded;
a delivery unit selectively spreading the air flaps;
a rotation unit selectively rotating the air flaps; and
a controller controlling the delivery unit and the rotation unit according to an operation status of a vehicle.

2. The system of claim 1, further comprising:
phase change material (PCM) tanks provided to an exterior side of the coolant inflow tank and the coolant exhaust tank and storing a phase change material,
wherein the phase change material heat-exchanges with the coolant stored in the coolant inflow tank and the coolant exhaust tank.

3. The system of claim 1, further comprising:
a fan shroud in which a cooling fan including a fan motor and a fan blade is mounted, the fan shroud disposed between the radiator and the engine;
a rotary shutter which is provided in the fan shroud while corresponding to an operation area of the fan blade, and in which an area through which air passes is varied in a circumferential direction; and
a plurality of flaps which are provided in the fan shroud, and that open and close a part of a portion where the rotary shutter is not mounted.

4. The system of claim 3, wherein the rotary shutter includes:
a plurality of shutter blades which are provided to be rotatable about a rotation shaft; and
a shutter actuator which rotates the plurality of shutter blades, and changes the area through which air passes.

5. The system of claim 4, wherein the shutter blades include:
an operation blade which is rotated about the rotation shaft by an operation of the shutter actuator; and
a plurality of sub-blades which are provided to be superimposed on the basis of the rotation shaft to be spread or folded fanwise in accordance with rotation of the operation blade.

6. The system of claim 5, wherein operation protrusions are provided to the shutter blades, respectively, and
when the operation blade is spread or folded, any one of the plurality of sub-blades is spread or folded, and remaining sub-blades are sequentially spread or folded.

7. The system of claim 3, wherein electromagnets are provided on the plurality of flaps so that the plurality of flaps are opened and closed in accordance with an electric current supplied to the electromagnets.

8. The system of claim 3, further comprising:
a controller controlling an open area of the rotary shutter, operations of opening and closing the plurality of fan flaps, the cooling fan, the delivery unit, and the rotation unit according to an operation status of the vehicle,
wherein the operation modes of the system include:
a first mode in which the plurality of flaps are closed, the rotary shutter is completely closed, the plurality of air flaps are completely closed, and the operation of the cooling fan is turned off;
a second mode in which the plurality of fan flaps are closed, the rotary shutter is completely opened, a rotation angle of the air flaps is controlled in a state that the plurality of air flaps are expanded, and the operation of the cooling fan is turned off;
a third mode in which the plurality of fan flaps are opened, the rotary shutter is completely opened, the air flaps are completely opened in a state that the plurality of air flaps are expanded, and the operation of the cooling fan is turned off; and
a fourth mode in which the plurality of fan flaps are closed, the open area of the rotary shutter is controlled, the plurality of air flaps are folded, and the operation of the cooling fan is controlled.

9. The system of claim 8, further comprising:
an atmospheric temperature sensor which measures an atmospheric temperature, and outputs a corresponding signal;
a speed sensor which measures a vehicle speed, and outputs a corresponding signal;
an air conditioning pressure sensor which measures air conditioning internal pressure, and outputs a corresponding signal;
an air conditioning switch sensor which measures an operational signal of an air conditioning switch, and outputs a corresponding signal;
a refrigerant temperature sensor which measures a refrigerant temperature, and outputs a corresponding signal; and
a position sensor which measures the open area of the rotary shutter, and outputs a corresponding signal,
wherein the control unit determines the operating state of the vehicle based on the corresponding signals from the respective sensors, and controls operations of the rotary shutter, the plurality of flaps, and the cooling fan in accordance with the operating state of the vehicle in any one mode of the first to fourth modes.

10. The system of claim 1, wherein the vertical supporting portion includes:
a guide rail having a width which becomes smaller along a lower direction,
wherein stoppers are provided in the plurality of air flaps, the stoppers having a size corresponding to the width of the guide rail so that the plurality of air flaps are positioned at predetermined positions.

11. The system of claim 1, wherein the delivery unit includes:
a delivery screw provided to any one of the guide rails;
a delivery plate supporting a lowest air flap of the plurality of air flaps, engaged with the delivery screw, and adjusting a position of the lowest air flap when the delivery screw is rotated; and
a delivery motor selectively rotating the delivery screw.

12. The system of claim 1, wherein the rotation unit includes:
rotation gears respectively engaged to the plurality of air flaps;
a rotation screw provided to another guide rail and selectively engaged with the rotation gears; and
a rotation motor selectively rotating the rotation screw.

13. The system of claim 1,
wherein the delivery unit includes:
a delivery screw provided to any one of the guide rails; and a delivery plate supporting a lowest air flap of the plurality of air flaps, engaged with the delivery screw, and adjusting a position of the lowest air flap when the delivery screw is rotated, wherein the rotation unit includes:
   rotation gears respectively engaged to the plurality of air flaps; and
   a rotation screw provided to another guide rail and selectively engaged with the rotation gears, and wherein the air flow rate control shutter apparatus further includes a driving motor selectively rotating the delivery screw or the rotation screw.

14. The system of claim 1, further comprising an encapsulator which surrounds the engine compartment.

* * * * *